(12) United States Patent
Manilla et al.

(10) Patent No.: US 11,615,502 B2
(45) Date of Patent: Mar. 28, 2023

(54) DIGITAL ADMINISTRATION OF GAMING UNITS

(71) Applicant: CHIP-UP, LLC, Pittsburgh, PA (US)

(72) Inventors: Marcellino Manilla, Wexford, PA (US); John Victor Heutsche, Sharpsville, PA (US)

(73) Assignee: CHIP-UP, LLC, Pittsburgh, PA (US)

( * ) Notice: Subject to any disclaimer, the term of this patent is extended or adjusted under 35 U.S.C. 154(b) by 208 days.

(21) Appl. No.: 16/581,850

(22) Filed: Sep. 25, 2019

(65) Prior Publication Data

US 2020/0020066 A1 Jan. 16, 2020

Related U.S. Application Data

(63) Continuation of application No. 15/860,237, filed on Jan. 2, 2018, now Pat. No. 10,664,938, which is a continuation-in-part of application No. 15/639,706, filed on Jun. 30, 2017, now abandoned.

(60) Provisional application No. 62/393,313, filed on Sep. 12, 2016, provisional application No. 62/357,086, filed on Jun. 30, 2016.

(51) Int. Cl.
| | |
|---|---|
| *G06Q 50/34* | (2012.01) |
| *G06Q 20/40* | (2012.01) |
| *G06Q 20/04* | (2012.01) |
| *G06F 21/32* | (2013.01) |
| *G06Q 20/38* | (2012.01) |
| *G06Q 20/32* | (2012.01) |

(52) U.S. Cl.
CPC .............. *G06Q 50/34* (2013.01); *G06F 21/32* (2013.01); *G06Q 20/045* (2013.01); *G06Q 20/381* (2013.01); *G06Q 20/4014* (2013.01); *G06Q 20/3276* (2013.01)

(58) Field of Classification Search
CPC ........................... G07F 17/3244; G06Q 50/34
See application file for complete search history.

(56) References Cited

U.S. PATENT DOCUMENTS

| | | | |
|---|---|---|---|
| 6,394,907 | B1 | 5/2002 | Rowe |
| 6,547,131 | B1 | 4/2003 | Foodman et al. |
| 6,739,972 | B2 | 5/2004 | Flannagan-Parks et al. |
| 6,758,393 | B1 | 7/2004 | Luciano et al. |
| 6,997,807 | B2 | 2/2006 | Weiss |
| 2008/0076505 | A1 | 3/2008 | Nguyen et al. |

(Continued)

FOREIGN PATENT DOCUMENTS

WO    WO-2014057476 A2 *  4/2014    ............ A63F 13/12

*Primary Examiner* — Edward Chang
(74) *Attorney, Agent, or Firm* — Ohanianip PLLC; H. Artoush Ohanian

(57) ABSTRACT

Methods, systems, processes and others are provided for digital administration of gaming units including, for example, receiving a real-time request for gaming units; determining that the gaming unit administration application executing on the mobile device is located at the particular gaming location of the gaming establishment; determining that the real-time request for gaming units does not exceed the gaming unit limit of the account pre-approved by the gaming establishment; identifying a gamer distribution module associated with the particular gaming location for the current gaming activity associated with the request; and providing an authorization to distribute to the gamer associated with the request one or more requested gaming units.

9 Claims, 6 Drawing Sheets

(56) References Cited

U.S. PATENT DOCUMENTS

2011/0065497 A1 3/2011 Patterson
2014/0206436 A1* 7/2014 French ................ G07F 17/3244
                 463/25
2015/0243133 A1 8/2015 Nicholas

* cited by examiner

DIGITAL ADMINISTRATION OF GAMING UNITS

This application claims priority to and the benefit of U.S. patent application Ser. No. 15/860,237, filed on Jan. 2, 2018, entitled SECURE ELECTRONIC MONEY RESERVE, ACCOUNTING, AND FUNDS TRANSFER SYSTEM FACILITATING FUNDS AND INFORMATION TRANSFER BETWEEN A SERVICE PROVIDER, AT LEAST ONE SERVICE ESTABLISHMENT, AND AT LEAST ONE CUSTOMER, which is a continuation-in-part of patent application Ser. No. 15/639,706 filed on Jun. 30, 2017 which claims the benefit of U.S. Provisional Patent Application No. 62/393,313, filed on Sep. 12, 2016, and U.S. Provisional Patent Application No. 62/357,086, filed Jun. 30, 2016. The content of all prior applications is incorporated by reference in their entirety.

BACKGROUND

Gaming provides over $100 billion to the United States economy every year and vastly more worldwide. Despite having such a large economic impact, many of the systems implemented by gaming establishments are relatively rudimentary. This is shocking. For example, in most gaming establishments, such as in casinos, a gamer is required to purchase chips either with cash or a line of credit provided by the casino itself. Those chips so purchased are often only useful and redeemable at that casino and are relatively cumbersome to acquire. Purchasing chips often requires a gamer to have cash on hand to continue gaming or go to an automated teller machine ('ATM') to obtain more cash to continue gaming. In pausing their gaming to obtain cash, gamers may simply lose interest and not return to their previous gaming activity—or may lose opportunity as the quality of their gaming may be coming to the foreground. As such, conventional systems are inefficient and needlessly burdensome on gamers.

Rudimentary administration of gaming has had unintended results. For example, gaming institutions are often used for money laundering. More particularly, a casino patron may put large amounts of money in play, but gambles very little before cashing out in an effort to launder money that has been illegally obtained. For example, a bank robber steals $50,000 from a large bank. Most banks mark cash with exploding dye or sequential numbering of the large bills. To avoid being apprehended, the bank robber needs to exchange the stolen money for money that cannot be traced back to the robbery. In this situation, a bank robber may put $1,000 in $20 bills into a slot machine and spin twice before cashing out. Whether the slot machine pays the bank robber in coins or a slot ticket is irrelevant because the traceable money is in the machine and the bank robber will effectively receive "clean" or "laundered" money.

A digital solution is more secure and better serves the needs of the public. According to IbisWorld Research, "The fastest growing service industry operators have provided over the five years to 2017 has been mobile wallet payment software. Companies like Starbucks build mobile apps leveraging software from industry operators to process in-app payments. This allows operators to reduce the time it takes for customers to pay for their orders and improve operational efficiencies. Additionally, mobile wallets generate a unique token linked to each consumer's individual purchases. This provides consumers with the confidence that their purchases are being processed as safely as possible. Due to the ease and safety mobile wallet payments provide, the number of industry transactions from the segment increased from 300.0 million in 2012 to 500.0 million in 2015 according to research by the Federal Reserve. IBISWorld estimates that this segment will account for 15.7% of all transactions processed by industry operators in 2017."

BRIEF DESCRIPTION OF THE DRAWINGS

Many aspects of the present disclosure can be better understood with reference to the accompanying drawings. The components in the drawings are not necessarily to scale, with emphasis instead being placed upon clearly illustrating the principles of the disclosure. Moreover, in the drawings, like reference numerals designate corresponding parts throughout the several views. Other technical advantages may become readily apparent to one of ordinary skill in the art after review of the following figures and description.

DETAILED DESCRIPTION

Figure 1:
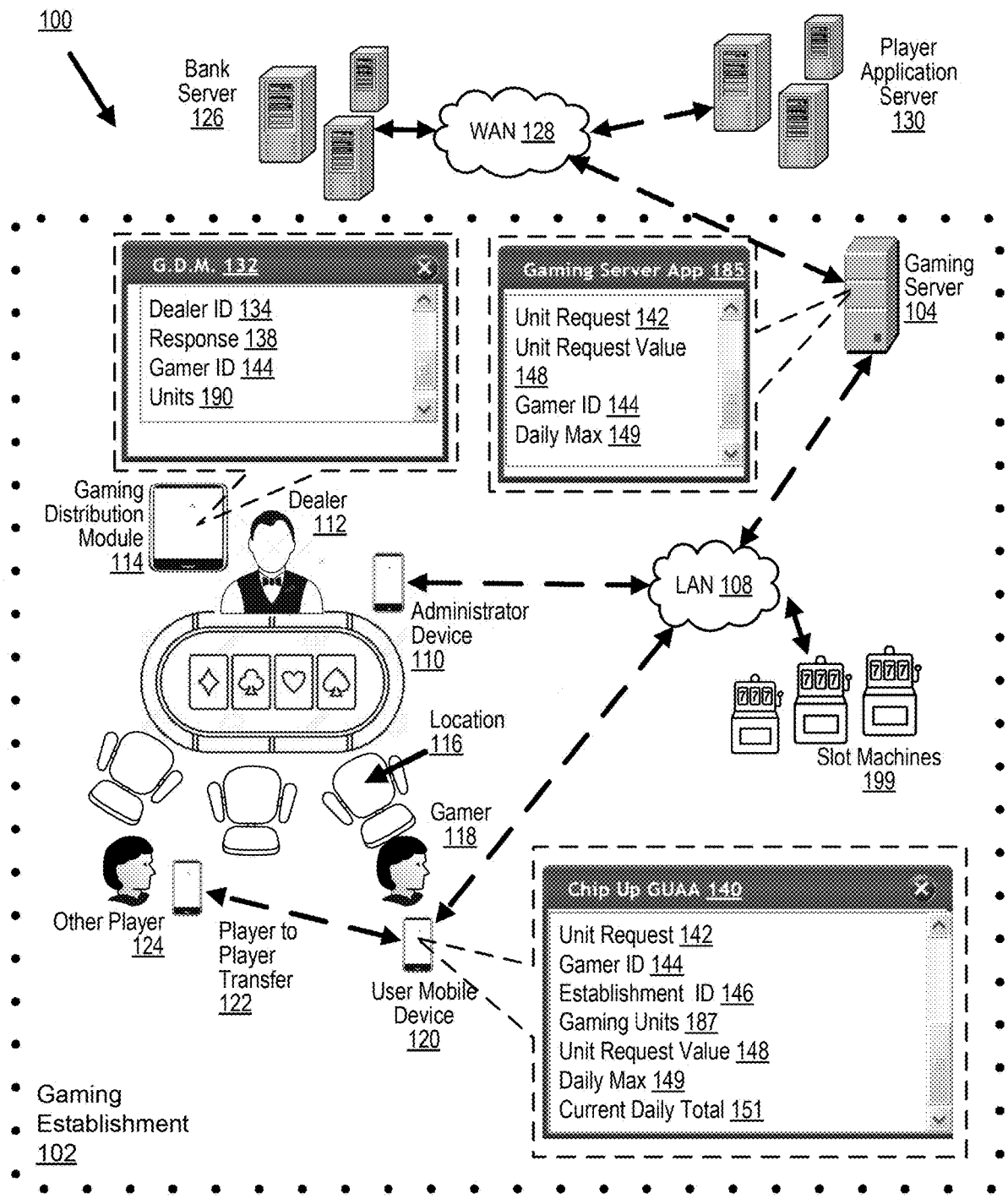
FIG. 1 sets forth a system diagram illustrating a system for digital administration of gaming units according to example embodiments of the present invention.

Example embodiments of the present invention are described with reference to the accompanying drawings, beginning with FIG. 1. FIG. 1 sets forth a system diagram illustrating a system for digital administration of gaming units according to example embodiments of the present invention. The system of FIG. 1 includes a gaming server (104) associated with a gaming establishment (102) that is coupled for data communications through a network (108) to a gaming unit administration application (140) executing on a mobile device (120) of a gamer (118) who is occupying a particular gaming location (116) of the gaming establishment (102). In the example of FIG. 1, the gaming establishment (102) of FIG. 1 is further coupled for data communications to a bank server (126) and a player application server (130) through a network (128).

The example gaming establishment (102) of FIG. 1 is depicted as a casino. This is for explanation and not for limitation. Gaming establishments according to embodiments of the present invention may be casinos, racetracks, venues with limited gaming such as convenience stores in states that allow such gaming, hotels with gaming, and many others gaming establishments as will occur to those of skill in the art.

The term "gaming" as it is used in this specification means the action, practice, and administration of gambling games. As such, gaming according to embodiments of the present invention includes the actions of the users, gamblers, dealers, administrators, and other persons involved with gaming establishments and all such establishments, entities, staff, systems, and personnel may be useful in embodiments of the present invention as will occur to those of skill in the art.

The gaming server (104) of FIG. 1 is coupled for data communications through a network (108) to a gaming unit administration application (140) executing on a mobile device (120) of a gamer (118). In the example of FIG. 1, the network (108) is depicted as a local area network (IAN') administered by the gaming establishment (102) and the data communications between the gaming unit administration application (140) and the gaming server (104) are wireless. This is for ease of explanation and not for limitation, in fact networks useful in digital administration of gaming units according to embodiments of the present invention include wide area networks ("WAN") and others—both wired and wireless—utilizing many different protocols as will occur to those of skill in the art.

The gaming server (104) of FIG. 1 is also coupled for data communications through a network (128) to a bank server (128) and a player application server (130). In the example of FIG. 1, the network (108) is depicted as a wide area network ('WAN'). This is for ease of explanation and not for limitation, in fact networks useful in digital administration of gaming units according to embodiments of the present invention include local area networks ("LAN") and others—both wired and wireless—utilizing many different protocols as will occur to those of skill in the art.

The example gaming server (104) of FIG. 1 is depicted as a server equipped with a gaming server application (185). The gaming server (104) equipped with the application (185) of FIG. 1 is configured to receive a real-time request (142) for gaming units from the gaming unit administration application (140) executing on a mobile device (120) of the gamer occupying the gaming location (116) of the gaming establishment (102).

In the example of FIG. 1, the gaming unit request (142) for gaming units as illustrated in gaming unit administration application (140) includes a gamer ID (144) identifying a gamer having a trusted account, often bank backed, authorized by the gaming establishment for the purchase of gaming units. The gaming unit request (142) of FIG. 1 also includes an establishment ID (146) identifying the gaming establishment (102) that authorized the purchase of the gaming units, the gaming units (187) requested, and/or the unit request value (148).

The number of units requested (187) and the unit request value (148) are identified in the example of FIG. 1 separately for explanation and not for limitation. In many establishments, such as for example many casinos, chips are simply rendered one-to-one for U.S. dollars or the local currency of the country of the casino. However, a gaming establishment may wish to offer units for different prices at different times and as such the request depicted in FIG. 1 separates the number of units requested and unit request value.

The attributes of the real time request (142) for gaming units of FIG. 1 are for explanation and not for limitation. Real-time requests for gaming units according to embodiments of the present invention may include many other attributes or fewer attributes as will occur to those of skill in the art.

In the example of FIG. 1, the request (142) may also include a daily max value (149) established for the gamer. Such a max value may be set by the user in establishing in linking an account with the bank server (126), the player application server (130) or other entity, set by a remote player application administering the gaming unit administration application (140) for the gamer, set by the gaming establishment, set the gamer's bank based on geography, daily use, real-time gaming trends and others, or many other entities as will occur to those of skill in the art.

In the example of FIG. 1, the request also includes a current daily total (151) that represents the current daily spend for that gamer at the gaming establishment. Such a daily spend is useful to the gaming establishment for regulatory compliance. Title 31 requires establishments that generate more than $1,000,00.00 in annual gaming revenues to report certain currency transactions. In some cases, monitoring the daily activity of a gamer is required for compliance and for the identification of suspicious activity such as money laundering.

The example gaming unit administration application (140) of FIG. 1 is implemented as a mobile application, commonly referred to as an app. Such a mobile application is a type of application software designed to run on a mobile device, such as a smartphone or tablet computer. Mobile applications frequently serve to provide users with similar services to those accessed on PCs. Mobile applications are generally small, individual software units with limited or dedicated functions.

The gaming unit administration application (140) of FIG. 1 is illustrated as having data communications through the LAN (108) with the gaming server (104) and then communications with the player application server (130) through a wide area network ('WAN'). This is for example and ease of explanation and not for limitation. In many embodiments, the gaming unit administration application (140) of FIG. 1 may be coupled for data communications directly with the player application server (130) through, for example, a cellular network or any other network as will occur to those of skill in the art.

As mentioned above, the example gaming unit administration application (140) is running on a mobile device (120). A mobile device as that term is used here generally means a portable computing device such as smartphone or tablet computer. However, gaming unit administration applications (140) according to embodiments of the present invention may also run on laptops, small form factor computers, or any other computing device as will occur to those of skill in the art.

The depiction of a mobile application and mobile device in the example of FIG. 1 is for explanation and not for limitation. Digital administration of gaming units according to embodiments of the present invention may use many different software and hardware platforms—wired and wireless. For example, in alternative embodiments, digital administration of gaming units may be administered with dedicated devices at fixed locations in a gaming establishment and users may access personal accounts and request gaming units through the dedicated devices.

Upon receipt of the request for gaming units, the example gaming server (104) of FIG. 1 is configured to determine that the gaming unit administration application (140) executing on the mobile device (120) is located at the particular gaming location of the gaming establishment. In the example of FIG. 1, the location (116) of the gamer (118) is used to identify the particular gamer (118) associated gaming unit administration application (140) making the unit request (142). For example, the location (116) of the gamer may be a particular seat at a particular card table in a gaming establishment such as a casino.

In other embodiments of the present invention, the gaming server (104) of FIG. 1 is configured to determine that the gaming unit administration application (140) executing on the mobile device (120) is located at a particular gaming location of the gaming establishment that is not at a defined location at a gaming table. Examples of such games where gamers may move while gaming include craps, roulette, betting on horseracing, betting on dog racing, and others as will occur to those of skill in the art.

One way of determining that the gaming unit administration application (140) executing on the mobile device (120) is located at a particular gaming location of the gaming establishment includes triangulation. Triangulation is the process of determining location of a point by measuring only angles to it from known points at either end of a fixed baseline. Triangulation differs from trilateration as it measures angles rather than the distance to the point.

Another way of determining that the gaming unit administration application (140) executing on the mobile device (120) is located at a particular gaming location of the gaming establishment includes trilateration. Trilateration is the process of determining absolute or relative locations of points by measurement of distances from at least three beacons. Trilateration works by using geometry of circles, spheres, or other triangles.

Another way of determining that the gaming unit administration application (140) executing on the mobile device (120) is located at a particular gaming location of the gaming establishment includes using GPS through the mobile device. The Global Positioning System (GPS), originally Naystar GPS, is a satellite-based radio navigation system owned by the United States government and operated by the United States Air Force. It is a global navigation satellite system that provides geolocation and time information to a GPS receiver anywhere on or near the Earth where there is an unobstructed line of sight to four or more GPS satellites. Obstacles such as mountains and buildings block the relatively weak GPS signals.

GPS does not require the user to transmit any data, and it operates independently of any telephonic or internet reception, though these technologies can enhance the usefulness of the GPS positioning information. The GPS provides critical positioning capabilities to military, civil, and commercial users around the world. The United States government created the system, maintains it, and makes it freely accessible to anyone with a GPS receiver.

The example gaming server (104) of FIG. 1 is configured to determine that the real-time request (142) for gaming units does not exceed the gaming unit limit of the account pre-approved by the gaming establishment. In many embodiments of the present invention, gaming unit administration application (140) is coupled for data communications with a player application server (130) and a bank server (120) through a wide area network ('WAN') (128). Such real-time data connectivity allows the gaming server (104) to authorized, verify, and communicated the validity of a request for gamin units and also distribute those gaming units to the gamer in a manner that is efficient but also in a manner that is secure and reduces the risk of fraud, money laundering, and other suspicious activity.

The player application server (130) of FIG. 1 provides server-side support for the gaming unit administration application (140) such that a gamer may download the gaming unit administration application (140) and provide the information of a bank or other commercial institution with whom the gamer has a relationship to link a bank account with the gaming unit administration application (140) such that requests for gaming units within the gaming establishment are to some extent bank backed. Once bank-backed in this manner, a gaming server may transact with the gaming unit administration application (140) with confidence to transmit, credit, or accept funds requesting gaming units and providing the rewards of gaming at one or more gaming establishments.

A gaming unit limit may be established with the player application server (130) prior to the gamer even entering the gaming establishment. Such a limit may be based on any number criteria established with the bank or commercial institution who communicates through one the more bank servers (126) to the player application server (130) for the gamer. Criteria for that determination may include total balance the gamer has with bank, line of credit or other credit criteria with the bank, ability to draw credit with the bank including the use of credit cards and other bank credit programs administered by the bank, and many others as will occur to those of skill in the art.

In alternative embodiments of the present invention, a gaming unit limit may be established by the gaming establishment itself. In such embodiments, individual gaming establishments may establish a limit based upon a number of criteria such as amount requested, time of day, identification of the user, policies of the gaming establishment, reporting of transaction requirements of the region and gaming establishment, and many others as will occur to those of skill in the art.

The example gaming server (124) of FIG. 1 is also configured to identify a gamer distribution module (114) associated with the particular gaming location (116) for the current gaming activity associated with the request (142). The gamer distribution module (114) in the example of FIG. 1 is implemented as a stand-alone module of automated computing machinery—hardware, software, or both—configured to provide, in this example, a dealer (112) authorization from the gaming server (104) to distribute to the gamer (118) associated with the request (142) one or more requested gaming units (187). In the example of gaming tables of FIG. 1, such a distribution module (114) may be installed at a place at the table favorable and made available to the dealer (112) or some other administrator of the table such that the dealer or administrator does not need to provide their own device. In other embodiments, the gaming distribution module may be implemented as an application installed on an administrator mobile device (110) available to the dealer (112) or the administrator. In other games where gamers move locations during gaming such as craps, roulette, horseracing and others a gaming distribution module may also be usefully implemented as an application on a mobile device such that the dealer or other administrator may be mobile and usefully identify the gamer and distribute the gaming units to the gamer through the gaming unit administration application (140) executing on a mobile device (120) of the gamer occupying the gaming location (116).

In the example of FIG. 1, the gaming distribution module (132) maintains a dealer ID (134) that identifies either a dealer, administrator, stand-alone module, particular administrator device (110), or other entity or device that supports an operator in the gaming establishment (102). The example gaming distribution module (132) receives from the gaming server a response (138) that includes a gamer ID (144) that identifies the gamer who made the request for gaming units and also the number of gaming units (190) authorized for distribution to that gamer (118). As mentioned elsewhere in this disclosure, the gaming units may be distributed to the gamer digitally through the use of a barcode, through the gaming unit administration application (140), by providing chips directly to the gamer, providing cash directly to the gamer or in other ways as will occur to those of skill in the art. In typical embodiments, regardless of the distribution of the gaming units to the gamer, the distribution is recorded and verified with the gaming unit administration application (140) such that other functions of the gaming unit administration application (140) may be administered such as daily maximums, reporting criteria and so on as will occur to those of skill in the art.

The example gaming server (124) of FIG. 1 is also configured to provide, to the gaming distribution module (114) for the current gaming activity, an authorization to distribute to the gamer associated with the request one or more requested gaming units. Such an authorization to provide gaming units may include an authorization to directly provide the gamer (118) with chips backed by the gaming establishment (102), provide digital units to the gamer for establishments equipped with digital commerce through for example a barcode or other encoded method, send cash directly to the gamer for use in gaming, or any other methods as will occur to those of skill in the art.

Gaming establishments are often environments for positive human interaction. It is not uncommon for one gamer to loan or give money to another for convenience, fun, kindness, or some other reason. In the example of FIG. 1, the gaming unit administration application (140) executing on the mobile device of the gamer (118) is further configured to transfer one or more gaming units to another player (124). In the example of FIG. 1, a player-to-player transfer (120) of gaming units authorized by the gaming establishment (102) may be transferred from the gamer (118) to another player (124). In some embodiments the player-to-player transfer (120) may take the form of a request similar to a request for gaming units from the gaming server but with another recipient defined. In alternative embodiments, such a transfer may be implemented by direct transfer from one gaming unit administration application (140) using a direct-transfer system such as applications supported by Venmo, Cash, and others as will occur to those of skill in the art.

The example embodiment of FIG. 1 illustrates only a single gaming establishment. This is for ease of explanation and not for limitation. In the example of FIG. 1, the same gaming unit administration application (140) executing on the mobile device of the gamer (118) may seamlessly move from one gaming establishment to another and request gaming units. The only requirement to do so is that the gaming establishment have connectivity with the gaming unit administration application (140) and provide gaming units through such an application.

The example of FIG. 1 also includes a player application server (130). The player application server (130) provides server-side support for digital administration of gaming units according to various example embodiments of the present invention. The player application server (130) of FIG. 1 provides real time support for both the gaming unit administration application (140) and the gaming server (104) supporting the gamer operating in the gaming establishment with confidence and the establishment supporting the gaming with confidence. Furthermore, such mutual confidence reduces risks such as money laundering, fraud, and so on as will occur to those of skill in the art.

The player application server (130) of FIG. 1 also provides a vehicle for the gamer to request and download the gaming unit administration application (140) through, for example, a mobile device (120). As described in more detail below, such a player application server may usefully establish or maintain daily limits, report transactions at the gaming establishment for the gamer according to Title 31, establish requirements, limits, or other criteria for gaming geographic, financial or otherwise, and many other functions as will occur to those of skill in the art.

In the example of FIG. 1, slot machines (199) are also coupled for data communications with the network (108) of the gaming establishment (102). Digital administration of gaming units according to embodiments of the present invention may take advantage of the current back-end technology used by slot machines as well as allow users to exploit embodiments of the present invention through those machines as will occur to those of skill in the art.

Figure 2:
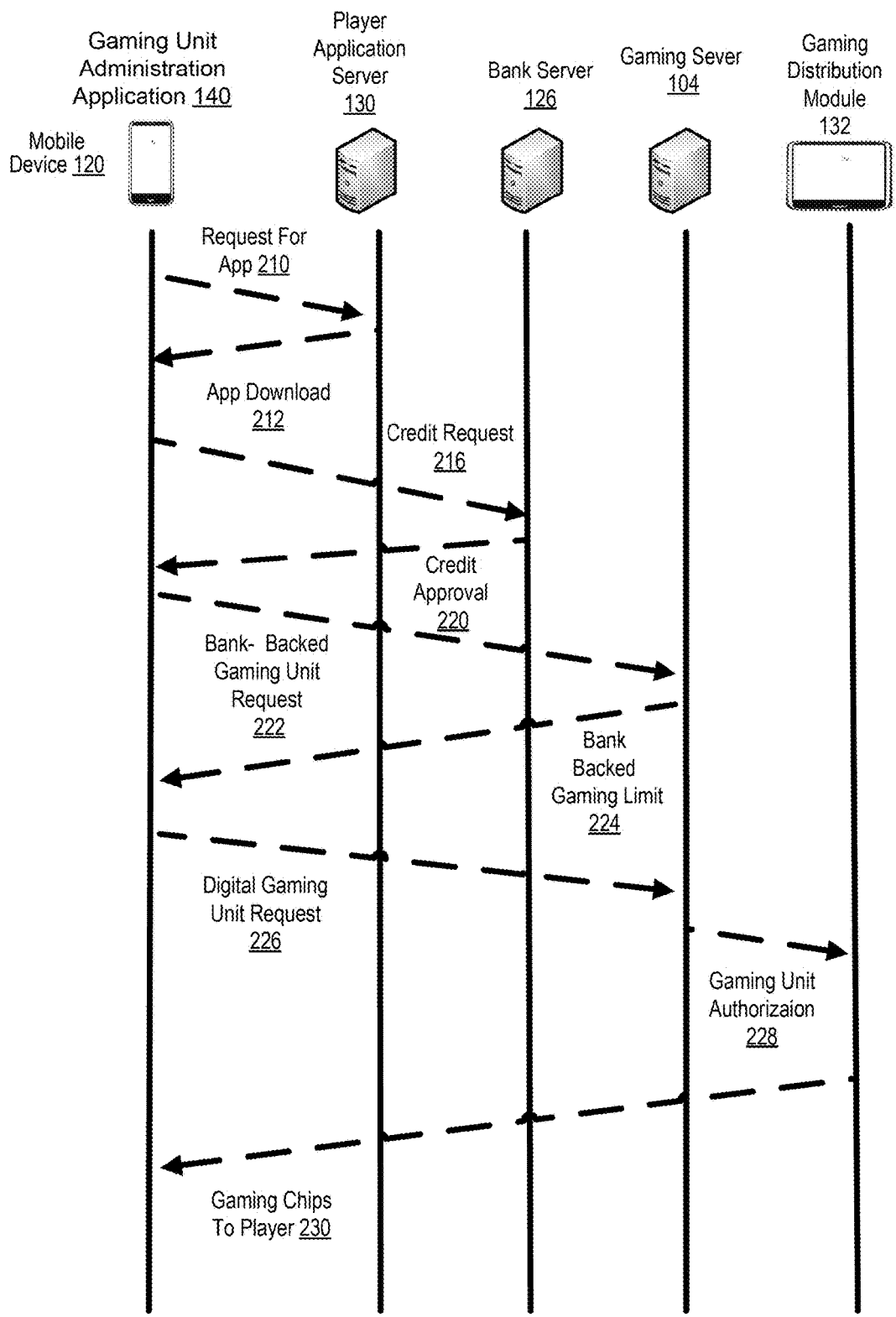
FIG. 2 sets forth a sequence diagram illustrating additional aspects of digital administration of gaming units according to various embodiments of the present invention.

For further explanation, FIG. 2 sets forth a sequence diagram illustrating aspects for digital administration of gaming units according to various embodiments of the present invention. In the example of FIG. 2, a gamer associated with a mobile device (120) requests (210) an application for digital administration of gaming units according to embodiments of the present invention from a player application server (130). In the example of FIG. 2, the player application server (130) provides a download (212) of the gaming unit administration application (140) in response.

In the example of FIG. 2, the gamer is empowered through the gaming unit administration application (140) to make a credit request (216) from a bank through a bank server (126). A credit request according to the example of FIG. 2 includes a request for credit from the bank, a withdrawal of funds from the bank for use through the gaming unit administration application (140) for the gamer while gaming, a loan from the bank, or any other allocation of funds from the bank to the gamer for use in gaming according to embodiments of the present invention as will occur to those of skill in the art.

In the example of FIG. 2, the bank server (126) provides a credit approval (220) to the gaming unit administration application (140) providing a bank backed reserve for gaming for the gamer through the gaming unit administration application (140). In so doing, the gaming unit administration application (140) is provided with the ability to provide bank backed gaming unit requests to a gaming establishment.

In the example of FIG. 2, the gaming unit administration application (104) sends through the mobile device a bank-backed gaming unit request (222) to the gaming server (104). In response the gaming server (104) sends to the gaming unit administration application (104) a bank-backed gaming limit (224) for use by the gamer at various gaming establishments. Such a request and limit may be administered in each gaming establishment or across multiple gaming establishments as will occur to those of skill in the art. In some embodiments of the present invention, such bank-backed unit request and gaming limits may be exchanged on a handshake upon the gamer entering a gaming establishment and occur in a manner transparently to the user.

Once at a gaming establishment and desiring gaming units, the example of FIG. 2, the gamer is empowered to send through the gaming unit administration application (140) a request (226) for gaming units. In the example of FIG. 2 and upon approval by the gaming server (104), the gaming server (104) sends to the gaming distribution module (132) a gaming unit authorization (228) providing authorization an administrator to provide to the gamer associated with the gaming unit administration application (140) the gaming units.

In the example of FIG. 2, the gaming distribution module (132) transmits (230) to the gaming unit administration application (140) the requested gaming units. An operator or administrator, such as a dealer for example, is then authorized to distribute gaming units to the gamer. The distribution of such gaming units may come in the form of digital gaming units, credits, physical chips, or any other gaming units as will occur to those of skill in the art.

Figure 3:
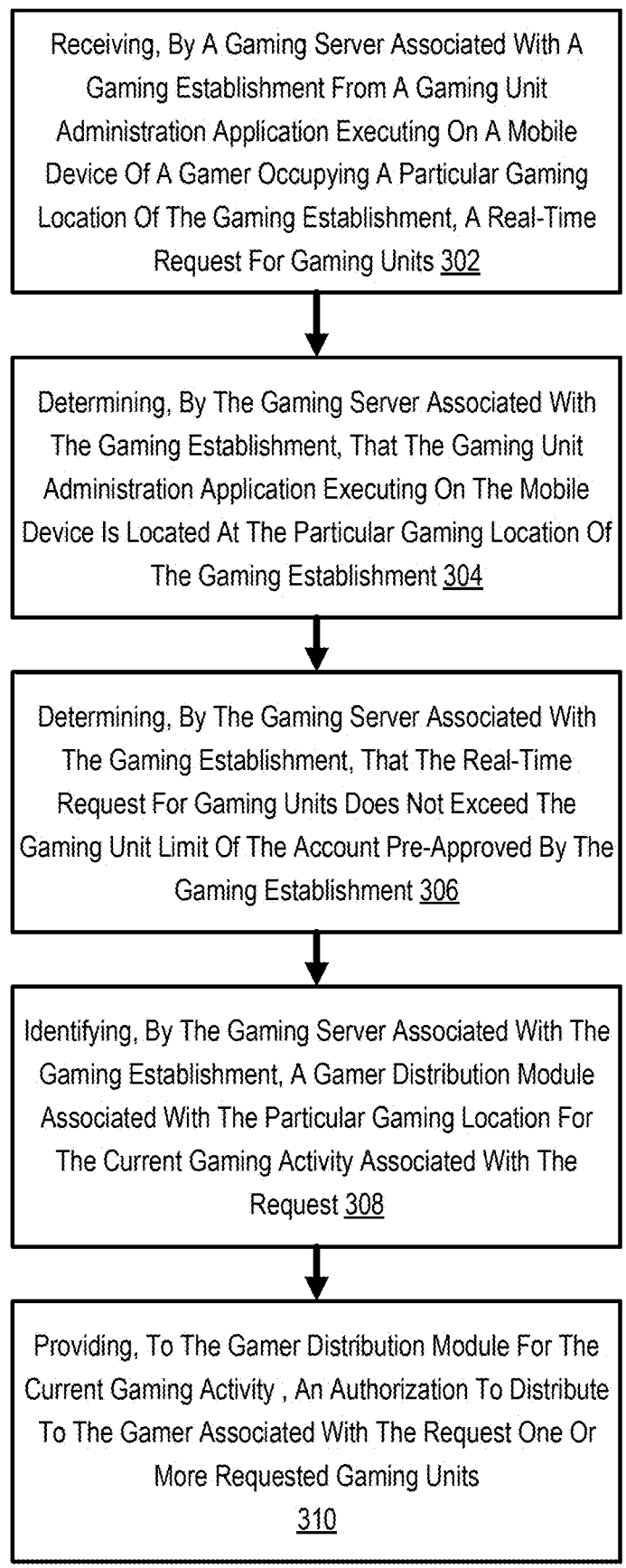
FIG. 3 sets forth a flow chart illustrating an example method for digital administration of gaming units according to embodiments of the present invention.

For further explanation, FIG. 3 sets forth a flow chart illustrating an example method for digital administration of gaming units according to embodiments of the present invention. The method of FIG. 3 includes receiving (302), by a gaming server associated with a gaming establishment from a gaming unit administration application executing on a mobile device of a gamer occupying a particular gaming location of the gaming establishment, a real-time request for gaming units.

The method of FIG. 3 also includes determining (304), by the gaming server, that the gaming unit administration application executing on the mobile device is located at the particular gaming location of the gaming establishment. As mentioned above, determining (304), by the gaming server, that the gaming unit administration application executing on the mobile device is located at the particular gaming location of the gaming establishment may be carried out by triangulating the mobile device from fixed positions within the gaming establishment, trilaterating the mobile device from fixed positions within the gaming establishment, receiving GPS coordinates of the mobile device and comparing the received GPS coordinates to fixed positions within the gaming establishment or in any other way that will occur to those of skill in the art.

The method of FIG. 3 also includes identifying (308), by the gaming server, a gamer distribution module associated with the particular gaming location for the current gaming activity associated with the request. Identifying (308), by the gaming server, a gamer distribution module associated with the particular gaming location for the current gaming activity associated with the request may be carried out by identifying a particular gaming location of the gaming establishment associated with an established position with respect to the game played or in other ways as will occur to those of skill in the art.

The method of FIG. 3 also includes providing (310), to the gamer distribution module for the current gaming activity, an authorization to distribute to the gamer associated with the request one or more requested gaming units. Providing (310), to the gamer distribution module for the current gaming activity, an authorization to distribute to the gamer associated with the request one or more requested gaming units may be carried out by determining that the real-time request for gaming units does not exceed the gaming unit limit of the account pre-approved by the gaming establishment or by a bank or other commercial institution.

Figure 4:
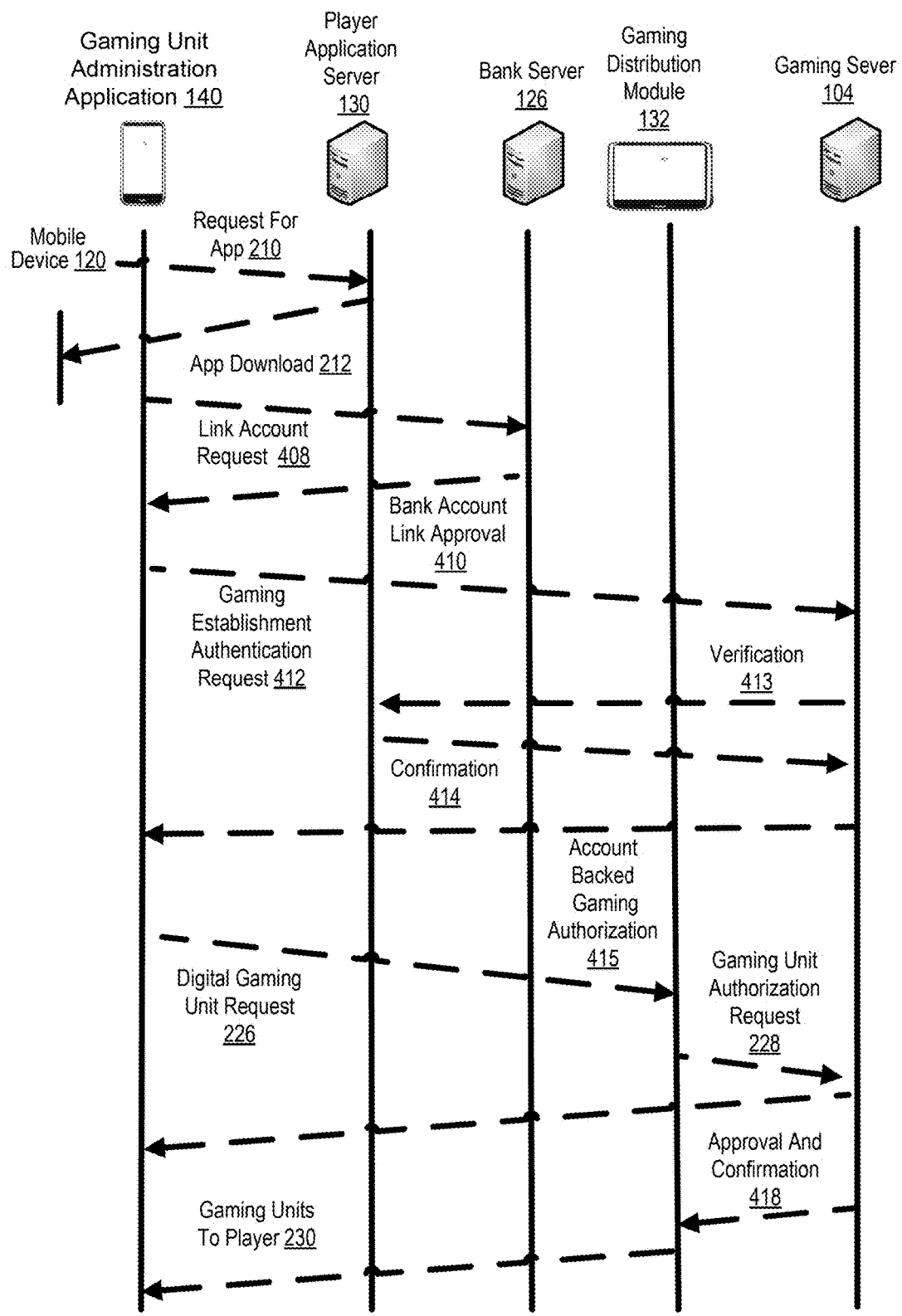
FIG. 4 sets forth a sequence diagram illustrating additional aspects of digital administration of gaming units according to various embodiments of the present invention.

FIG. 4 sets forth a sequence diagram illustrating additional aspects of digital administration of gaming units according to various embodiments of the present invention. In the example of FIG. 4, a gamer associated with a mobile device (120) requests (210) an application for digital administration of gaming units according to embodiments of the present invention from a player application server (130).

The player application server (130) of FIG. 4 represents server-side support for the gaming unit administration application (140) providing the download of the application itself to the mobile device (120) supporting the application (140), the ability to link the application to a bank account, and also transactional support such as daily limits and reporting criteria. Examples of such transactional support includes daily limits and reporting criteria such that the gamer is both authorized properly to request and receive gaming units but also properly restricted according to factors pre-established for the gamer's current gaming, laws governing the gaming establishment, restrictions established by the gaming establishment and others as will occur to those of skill in the art.

In the example of FIG. 4, in response to the request (210), the player application server (130) provides a download (212) of the gaming unit administration application (140). In the example of FIG. 4, the gamer is empowered through the gaming unit administration application (140) to link (408) an account from a bank through a bank server (126) to the gaming unit administration application (140) such that gaming according to embodiments of the present invention are presently and securely funded. Such a link request according to the example of FIG. 4 includes authorization to allocate funds from the bank through the gaming unit administration application (140) for the gamer while gaming as will occur to those of skill in the art.

In the example of FIG. 4, the gaming unit administration application (140) now installed on the gamer's mobile device (120) sends a request (408) to link a bank account to fund the gamer to a bank server (126). In response to such a request (408) to link a bank account, the bank server applies rules developed to approve or deny such a request. In the example of FIG. 1, the request is approved and the bank server (126) links the bank account administered by the bank server (126) with the gaming unit administration application (140) running on the mobile device (120) and sends an approval (410) to the gamer through the gaming unit administration application (140). In so doing, the gaming unit administration application (140) is provided with the ability to provide bank-backed gaming unit requests to a gaming establishment when the gaming unit administration application (140) is authorized by gaming establishments and request gaming units. Furthermore, such a request for gaming units is now bank backed and as such, gaming establishments are incentivized to provide such units as they are tracked and reported thereby reducing the risk of money laundering, theft, and fraud.

In some embodiments, the bank may establish additional restraints to the use funds entrusted through the gaming unit administration application (140) such as a total maximum spending limit, a daily limit, geographic restrictions of use, a minimum spending limit and many other limits as will occur to those of skill in the art. Such additional restraints may be sent to the player application server (130) and administered at the sever in real-time or such additional restraints may be administered in real-time by the gaming unit administration application (140).

Having downloaded the gaming unit administration application (104) and linked the application to a bank account, the gamer of FIG. 1 is empowered to begin using the application in a gaming establishment and requesting and receiving gaming units. For example, upon entering into a gaming establishment, the gaming unit administration application (140) of FIG. 4 initiates an authentication transaction with the gaming server (104) who authorizes gaming units for the gaming establishment in accordance with the present invention. In the example of FIG. 4, the authentication transaction includes a gaming establishment authentication request (412) that provides the gaming server (104) with credentials, bank information, and other information such as restrictions established by the bank, player application server, or gamer. Such information allows the gaming server to determine whether the gamer is authorized to receive gaming units through the gaming unit administration application.

In the example of FIG. 4, the gaming server (104) sends a verification request (413) to the player application server (130) and receives a confirmation (414) from the player application server (130). Such a verification may include additional information governing the gamer's ability to receive gaming units such as a daily maximum, a total maximum, a geographic restraint or any other restriction or information that will occur to those of skill in the art.

In the example of FIG. 4, the gaming server (104) then sends to the gaming unit administration application (140) an account backed gaming authorization (415). Such an authorization empowers the gamer to request and receive gaming units in the gaming establishment through the gaming unit administration application (140) running on the mobile device (120).

In some embodiments of the present invention, requests for gaming units may be made directly to the gaming server (104). In other embodiments, requests for gaming units may be made to a local gaming distribution module (132) such as a module administered by a dealer, associated with a particular game such as craps, slot machines, and other games as will occur to those of skill in the art. In the example of FIG. 4, the gamer sends a digital gaming unit request (226) to the gaming distribution module (132) through the gaming unit administration application (140) running on the gamer's mobile device (120). In the example of FIG. 4, the gaming distribution module (132) receives the request (226) and sends in turn a gaming unit authorization request to the gaming server (104) to confirm that the request (226) is valid.

Upon determining that the request (226) is valid, in the example of FIG. 4, the gaming server (104) sends an approval and confirmation (418) to both the gaming unit administration application (140) and also to the gaming distribution module (132). In the example of FIG. 4, an approval and confirmation (418) to both the gaming unit administration application (140) and also to the gaming distribution module (132) provides the gamer a notification that the request has been approved and also notifies the gaming distribute module (132) that gaming units may be distributed to the gamer.

Upon receipt of the approval and confirmation (418), in the example of FIG. 4, the gaming distribution module (132), provides gaming units to the gamer. In some embodiments, such gaming units are provided as digital gaming units and stored and administered in the gaming unit administration application (140). In other embodiments, such gaming units may be given directly to a gamer such as by providing physical chips to the user or in other ways as will occur to those of skill in the art. In such embodiments, often the gaming unit administration application is also provided with information identifying that the physical chips have been provided to the gamer and the distribution may be properly registered in the gaming unit administration application.

Figure 5:
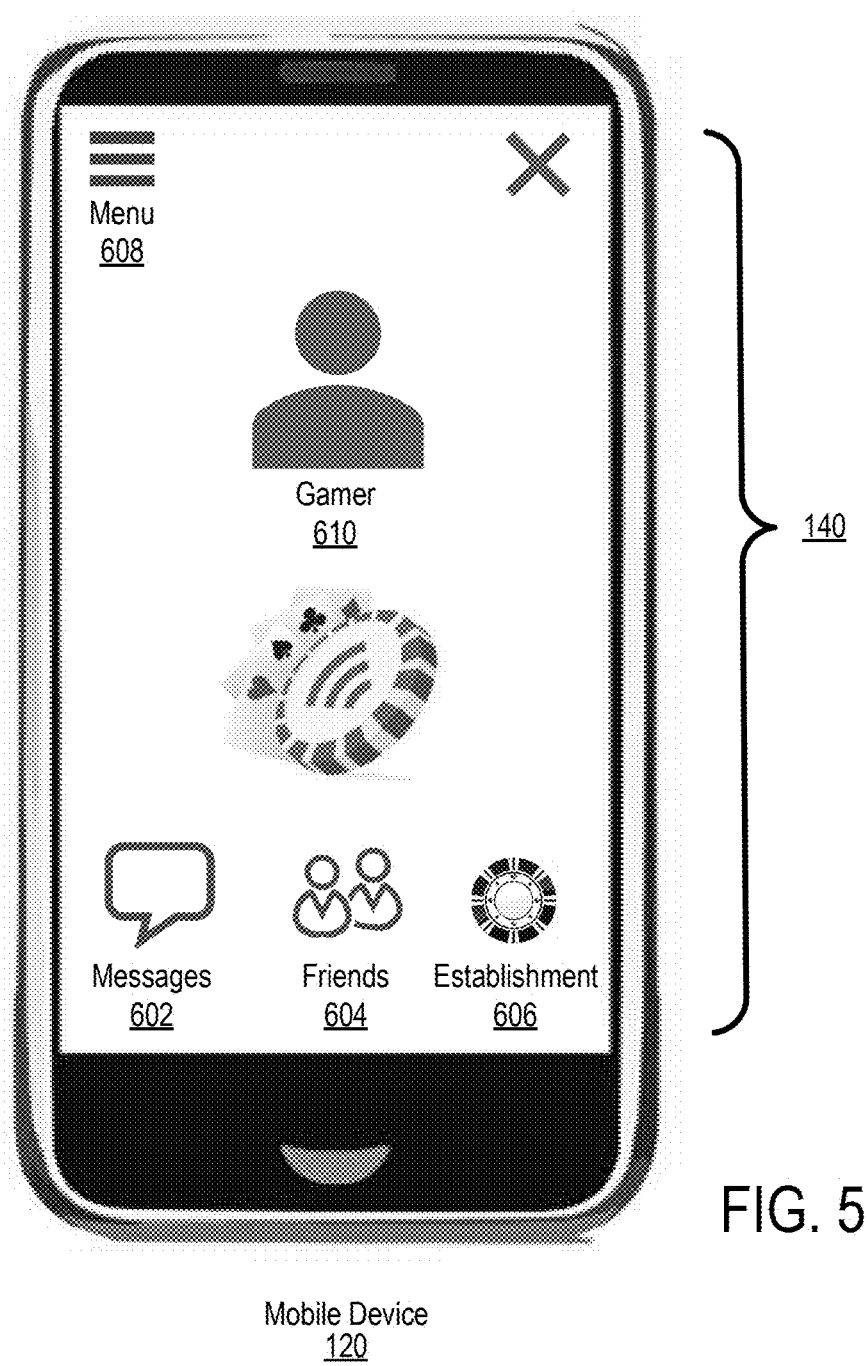
FIG. 5 sets forth a line drawing illustrating a gaming unit administration application running on a mobile device according to embodiments of the present invention.

For further explanation, FIG. 5, sets forth a line drawing illustrating a gaming unit administration application (140) running on a mobile device (120) according to embodiments of the present invention. In the example of FIG. 5, the gaming unit administration application (140) has a menu (608) providing graphical user interface controls for various functions of the application. The gaming unit administration application (140) also includes an identification of the gamer (610).

The gaming unit administration application (140) of FIG. 5 also includes a messaging interface (602) to communicate with other gamers using the same application to empower one another to game together, take advantage of local benefits and reductions in price, or any other use of gamer-to-gamer communication that will occur to those of skill in the art.

The gaming unit administration application (140) of FIG. 5 also includes a friends icon (604) identifying contacts available for communications such as messaging through the gaming unit administration application (140). Invoking the friends icon may provide a vehicle for messaging other gamers, providing contact information such as telephone numbers or email addresses associated with other gamers and so on as will occur to those of skill in the art.

The gaming unit administration application (140) of FIG. 5 also includes a casinos icon (606) that identifies the current gaming establishment that the gaming unit administration application (140) is currently administering and also gaming establishments available for use by the gaming unit administration application (140).

Figure 6:
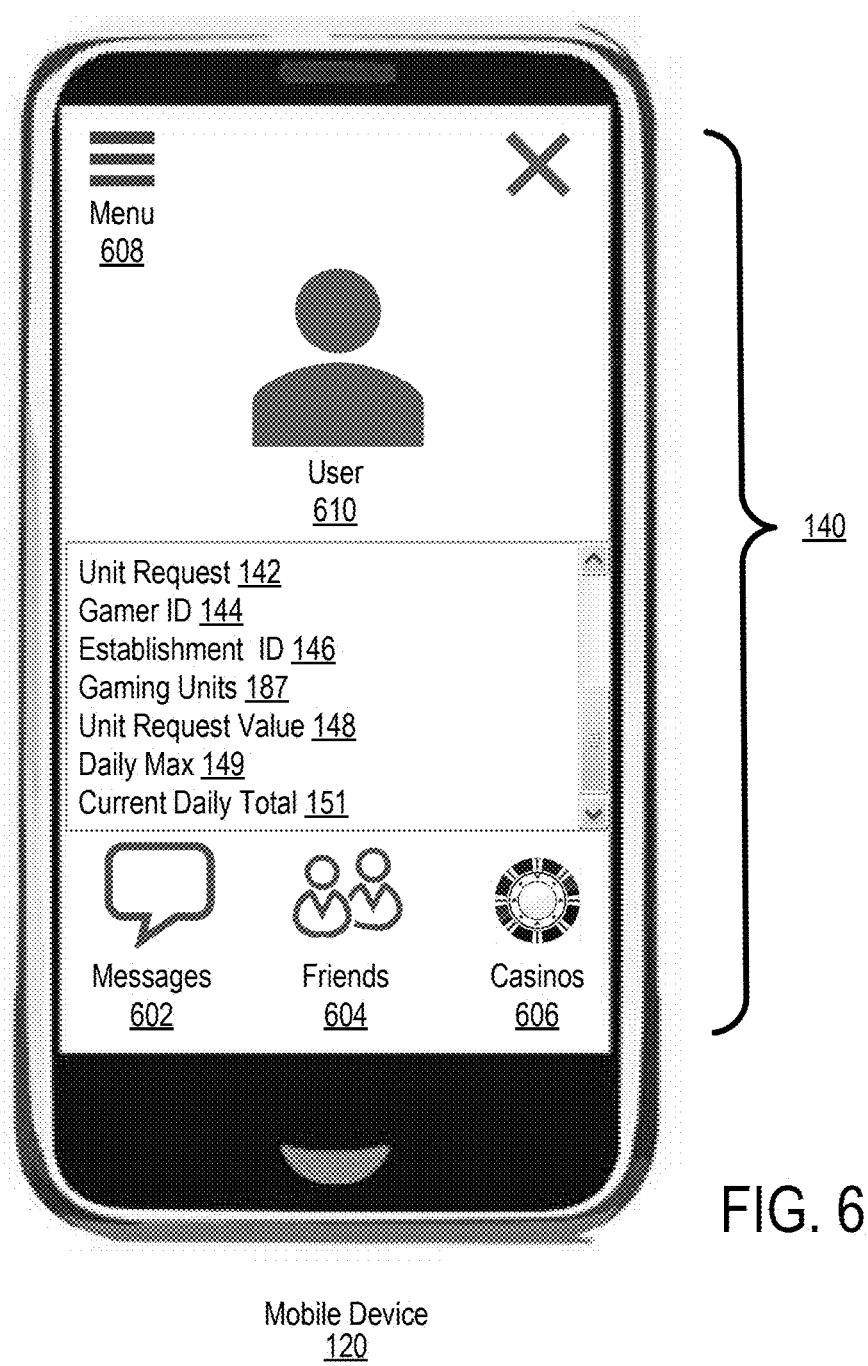
FIG. 6 sets forth a line drawing illustrating a gaming unit administration application running on a mobile device according to embodiments of the present invention.

For further explanation, FIG. 6, sets forth a line drawing illustrating a gaming unit administration application (140) running on a mobile device (120) according to embodiments of the present invention. In the example of FIG. 6, the gaming unit administration application (140) running on the mobile device (120) illustrates a gaming unit request (142). The gaming unit request (142) of FIG. 6 includes a gamer ID (144) and an establishment ID (144). The unit request (142) of FIG. 6 also includes the number of gaming units requested illustrated as gaming units (187) and the unit request value (148).

The gaming unit request of (142) of FIG. 6 also includes a daily maximum (149) for the gamer. Such a daily maximum provides support for legal clarity, administrative guidance, and transaction reporting for the gaming establishment in accordance with example embodiments of the present invention.

The gaming unit request of (142) of FIG. 6 also includes a current daily total (151) for the gamer. Such a current daily total provides support for legal clarity and transaction reporting for the gaming establishment in accordance with example embodiments of the present invention.

Modifications, additions, or omissions may be made to the various embodiments described herein without departing from the scope of the disclosure. For example, the components of the systems and apparatuses may be integrated or separated. Moreover, the operations of the various embodiments disclosed herein may be performed by more, fewer, or other components and the methods described may include more, fewer, or other steps. Additionally, steps may be performed in any suitable order.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for digital administration of gaming units, the method comprising: receiving, by a gaming server associated with a gaming establishment from a gaming unit administration application executing on a mobile device of a gamer occupying a particular gaming location of the gaming establishment, a real-time request for gaming units; wherein receiving a real-time request for gaming units includes:

receiving a request including one or more packets through a wireless protocol and wherein the request includes a data structure including a unit request field, a gamer ID field, an establishment ID field, and a field indicating the number of gaming units requested: and storing in memory the a data structure including a unit request field, a gamer ID field, an establishment ID field, and a field indicating the number of gaming units requested including writing to one or more hardware processor registers of the gaming server the data structure including a unit request field, a gamer ID field, an establishment ID field, and a field indicating the number of gaming units requested; wherein a gaming unit is a transactional unit recognized by the gaming establishment; wherein the gaming server associated with the gaming establishment is coupled for data communications with the gaming unit administration application through a network secured by the gaming establishment; and wherein the request for gaming units includes a gaming ID identifying a trusted account pre-approved by the gaming establishment for gaming units having a gaming unit limit; and determining, by the gaming server, that the gaming unit administration application executing on the mobile device is located at the particular gaming location of the gaming establishment; wherein determining that the gaming unit administration application is located at the particular gaming location includes wirelessly requesting and receiving, by the gaming server from a mobile gaming unit administration application executing on a mobile device, GPS location information and comparing, by the gaming server the received GPS location information with known GPS locations of the gaming establishment; determining, by the gaming server, that the real-time request for gaming units does not exceed the gaming unit limit of the account pre-approved by the gaming establishment including comparing the real-time request's gamer ID field and the field indicating the number of gaming units requested with previously issued gaming units and a maximum unit threshold associated with the gaming ID field in the real-time request including: reading from the processor registers one or more hardware processor registers of the gaming server the data structure including a unit request field, a gamer ID field, an establishment ID field, and a field indicating the number of gaming units requested; reading from memory stored on the gaming server a gamer ID and maximum unit threshold associated with the gaming ID; and comparing the maximum unit threshold associated with the gaming ID with the information of the real-time request; identifying, by the gaming server, a gamer distribution module associated with the particular gaming location for the current gaming activity associated with the request; and providing, to the gamer distribution module for the current gaming activity, an authorization to distribute to the gamer associated with the request one or more requested gaming units if the real-time request's gamer ID field and the field indicating the number of gaming units requested with previously issued gaming units and a maximum unit threshold associated with the gaming ID field in the real-time request.

2. The method of for digital administration of gaming units of claim 1 wherein the gaming unit is a transactional unit implemented as a casino chip.

3. The method of for digital administration of gaming units of claim 1 wherein identifying a trusted account pre-approved by the gaming establishment for gaming units having a gaming unit limit identifying a trusted account pre-approved by the gaming establishment for gaming units having a gaming unit limit includes accepting a near-field communication transaction at through the gaming distribution module.

4. The method for digital administration of gaming units of claim 1 wherein the particular gaming location of the gaming establishment is associated with an established position with respect to the game played.

5. The method for digital administration of gaming units of claim 1 wherein determining, by the gaming server associated with the gaming establishment, that the gaming unit administration application executing on the mobile device is located at the particular gaming location of the gaming establishment further comprises triangulating the mobile device from fixed positions within the gaming establishment.

6. The method for digital administration of gaming units of claim 1 wherein determining, by the gaming server associated with the gaming establishment, that the gaming unit administration application executing on the mobile device is located at the particular gaming location of the gaming establishment further comprises trilaterating the mobile device from fixed positions within the gaming establishment.

7. The method for digital administration of gaming units of claim 1 wherein determining, by the gaming server associated with the gaming establishment, that the gaming unit administration application executing on the mobile device is located at the particular gaming location of the gaming establishment further comprises receiving GPS coordinates of the mobile device and comparing the received GPS coordinates to fixed positions within the gaming establishment.

8. The method for digital administration of gaming units of claim 1 wherein the request for gaming units includes a temporary purchase price established in real-time at the discretion of the gaming establishment and wherein the method further comprises computing in real-time a number of gaming units associated with the purchase price at the current time of the request for gaming units.

9. The method for digital administration of gaming units of claim 1 further comprising transferring, by the gaming unit administration application executing on the mobile device of a gamer one or more gaming units to another player.

* * * * *